United States Patent [19]

Orlandi

[11] Patent Number: 4,971,102

[45] Date of Patent: Nov. 20, 1990

[54] LOCKING DEVICE TO FIT A MIXING VALVE FOR HOT AND COLD WATER INTO THE BODY OF A TAP

[75] Inventor: Alessio Orlandi, Castiglione d/Stiviere, Italy

[73] Assignee: Galatron S.r.l., Mantova, Italy

[21] Appl. No.: 396,511

[22] Filed: Aug. 21, 1989

[30] Foreign Application Priority Data

Aug. 22, 1988 [IT] Italy ................. 7058/88[U]

[51] Int. Cl.⁵ ............................................. F16K 11/06
[52] U.S. Cl. ................................... 137/454.6; 251/176
[58] Field of Search ............... 137/454.2, 454.6, 625.4, 137/625.41; 251/176, 180

[56] References Cited

U.S. PATENT DOCUMENTS

| 3,167,086 | 1/1965 | Michalski | 137/454.6 X |
| 3,807,455 | 4/1974 | Farrell | 251/180 X |
| 4,325,403 | 4/1982 | Uhlmann | 137/454.6 X |
| 4,469,123 | 9/1984 | Merrill | 137/454.6 X |
| 4,733,694 | 3/1988 | Knapp | 137/625.4 X |
| 4,865,071 | 9/1989 | Lambert et al. | 251/180 X |

*Primary Examiner*—Stephen M. Hepperle
*Attorney, Agent, or Firm*—McGlew and Tuttle

[57] ABSTRACT

Locking device to fit a mixing valve for hot and cold water into the body of a tap, in particular a locking nut bearing on the cover of the body of the mixing valve by interposing suitable elastic means to compensate eventual plays and distribute the locking load.

2 Claims, 1 Drawing Sheet

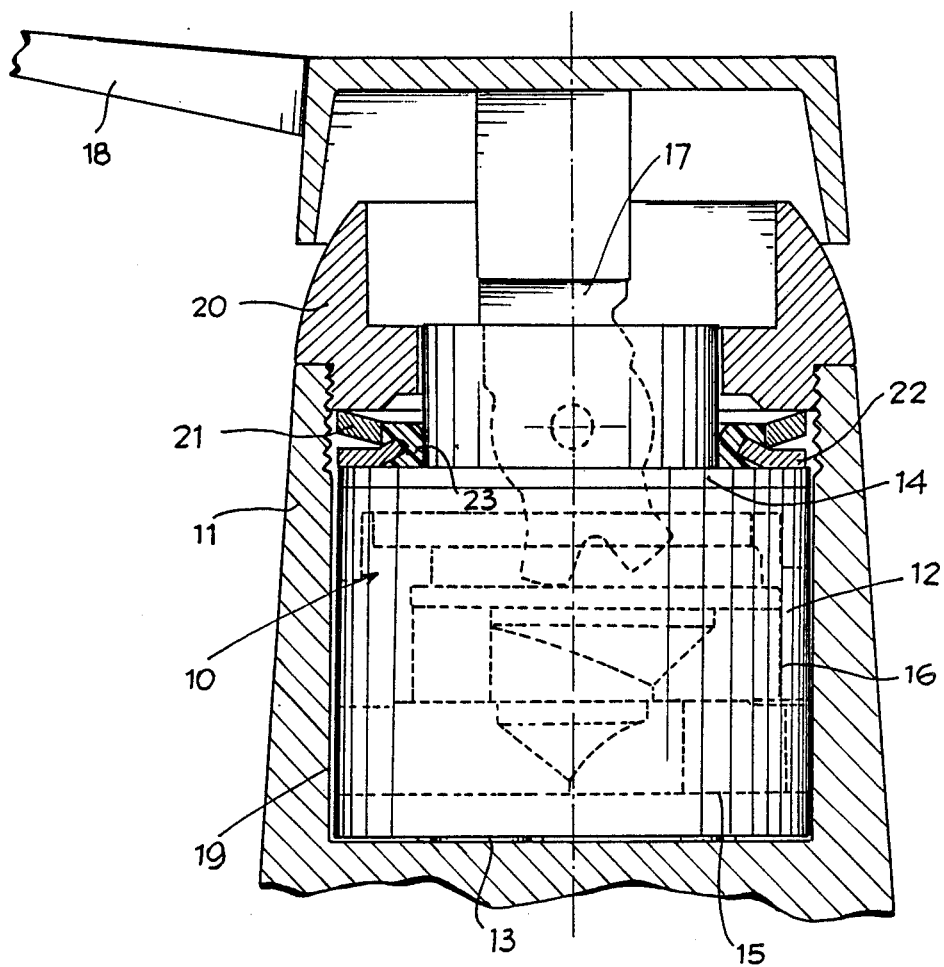

LOCKING DEVICE TO FIT A MIXING VALVE FOR HOT AND COLD WATER INTO THE BODY OF A TAP

FIELD AND BACKGROUND OF THE INVENTION

The present invention relates to the locking of a mixing valve for hot and cold water and more in particular to a locking device to fix such a valve into the body of a water tap.

Several well known mixing taps comprise, inside a cartridge type body with bottom and cover, two overlapping disks made of ceramic or a similar material, one of which is fixed while the other one is movable, the fixed disk having two inlet openings for the hot and cold water delivered by two conduits and one outlet opening to deliver the water to the spout of a tap, the movable disk being displaced and positioned by means of a control lever swinging on a transversal axis and rotating around a vertical axis and comprising a mixing chamber to displace on and in respect to the openings in the fixed disk.

The whole assembly is designed in such a way that the cartridge type body of the mixing valve can be fixed, by interposing suitable packings, to the bottom of a seat inside the body of a tap fitted with inlet pipes for hot and cold water and with a water outlet spout.

According to a known execution, the cartridge type body, i.e. the mixing valve, is fixed into the body of the tap by means of a number of screws inserted from its top and engaging the bottom of the seat. This system is however hardly used, also because it is not very satisfactory and rather complicated.

In another known execution the cartridge type body, i.e. the mixing valve, is fixed into the body of the tap by means of a locking nut screwed on top of the tap and directly leaning on the cover of the cartridge. Locking nuts are largely used to fasten this kind of cartridges, they however have the disadvantage to act as a rather rigid locking means as they are unable to suit eventual working errors or defects of the tap body, especially those concerning the depth of its seat. Owing to this perculiarity the kind of locking they achieve may be either too tight or too loose or even insufficient and thus jeopardize the correct operation of the mixing valve. In fact, it cannot be excluded that the nut bears on the top of the body of the tap and gets locked without suitably blocking the cartridge if the seat inside the tap is too deep or, on the contrary, that the nut lock the cartridge too tightly to the bottom of the seat owing to its insufficient depth. In the first case the cartridge might get loose inside the tap, while in the second case it might not be able to operate correctly.

SUMMARY AND OBJECTS OF THE INVENTION

It is therefore the purpose of the present invention to provide a remedy to the above mentioned disadvantages and to propose a locking device allowing a safe assemblage of mixing valves even if it is fixed into the seat available inside a tap which is not free from working faults.

To this end, between the locking nut and the cover of the cartridge type body of the mixing valve some elastic means are provided to compensate any play and to adjust and correctly distribute the locking load on the cartridge imposed on the cartridge as the locking nut is screwed on the body of the tap.

Said elastic means are preferably represented by at least one Belleville spring washer which may rest on the cartridge cover either directly or more advantageously through and interposed washer which is designed to distribute the load on said cartridge cover, said washer being preferably fitted with a sealing ring made of rubber or any other suitable material.

BRIEF DESCRIPTION OF THE DRAWINGS

An example of embodiment of the invention will now be described with reference to the accompanying drawing where the only FIGURE shows a sectional view of a mixing valve fixed into the body of a water tap.

DETAILED DESCRIPTION OF THE PREFERRED EMBODIMENT

In said drawing, by reference number (10) a mixing valve is indicated, said valve being fitted into the body (11) of a water tap and comprising a cartridge type body (12), a bottom (13) and a top or cover (14) enclosing two overlapping disks (15, 16), one of which is fixed while the other one is moved and adjusted by means of a control lever (17) fitted with a handle (18) in a known way.

Inside the body (11) of the tap a seat (19) is available to receive the mixing valve (10). The hot and cold water entering through its inlet pipes flows through the valve to be delivered through the spout of the tap.

As the operation of the mixing tap is well known it does not need a detailed description. Fitted into said seat (19) of the tap, the cartridge is fixed by means on a locking nut (20) screwed of the top of the tap body (11) and acting on the valve cartridge to fasten it to the bottom of said seat 19 after placing some seals on cover 14 of the valve cartridge.

Now, according to the invention, between the locking nut (20) and the cartridge body (12) at least one elastic element, e.g. a Beleville washer spring (21), is fitted in order to transmit and adjust the locking load to the cartridge and at the same time compensate any eventual play or tolerance, even if the locking nut is tightly closed on the body of the tap.

In addition, between said Belleville washer spring (21) and the cover (14) of cartridge body (12) a washer (22) may be assembled for a more even distribution of the locking load on the whole surface of cover (14) thus achieving the advantages as aimed at. Finally, a sealing ring (23) made of rubber or other elastic material, can be associated to said washer and/or Belleville spring for a radial adjustment of the valve cartridge.

I claim:

1. A mixing valve arrangement for mixing hot and cold water inside the body of a tap, comprising: a cartridge body having a bottom portion and a cover portion enclosing two overlapping disks, one of said disks being fixed and another of said disks being movable on said fixed disk, said fixed disk having two openings for allowing hot and cold water to be delivered by two inlet pipes and having one outlet opening for delivering mixed hot and cold water to a spout of the tap, said cartridge having a main body portion with a first diameter and an upper portion with a reduced diameter, said upper portion having an opening for receiving a control lever for adjusting said movable disk, the body of said tap defining a seat portion, said cartridge being positionable on said seat portion within the body of the tap; a sealing ring positionable about a periphery of said smaller diameter portion of said cartridge and resting on said cover portion; a washer element positioned about the periphery of said sealing ring and engaging said cover portion; a resilient member positioned about said sealing ring and having a lower side in contact with said washer; and, a locking nut threadably engaging the body of said tap, said locking nut having an opening for said cartridge portion of smaller diameter and for said control level, said locking nut being threadable to engage said resilient member, said resilient member acting on said washer element and a lower surface of said locking nut to bias the upper surface of said cartridge downwardly away from said locking nut to provide play between said cartridge and said locking nut and distribute a locking load from said locking nut to said cartridge.

2. A mixing valve arrangement for mixing hot and cold water inside the body of a tap, comprising: a cartridge body having a bottom portion and a cover portion enclosing two overlapping disks, one of said disks being fixed and another of said disks being movable on said fixed disk, said fixed disk having two openings for allowing hot and cold water to be delivered by two inlet pipes and having one outlet opening for delivering mixed hot and cold water to a spout of the tap, said cartridge having a main body portion with a first diameter and an upper portion with a reduced diameter, said upper portion having an opening for receiving a control lever for adjusting said movable disk, the body of said tap defining a seat portion, said cartridge being positionable on said seat portion within the body of the tap; a sealing ring positionable about a periphery of said smaller diameter portion of said cartridge and resting on said cover portion, said sealing ring being formed of an elastic material; a washer element engaged in a channel formed about the periphery of said sealing ring and having a cover engaging side face engaging said cover portion; a resilient member positioned about said sealing ring and having a lower side in contact with an upper side face of said washer, opposite said cover engaging side face; and, a locking nut threadably engaging the body of said tap, said locking nut having an opening for said cartridge portion of smaller diameter and for said control level, said locking nut being threadable to engage said resilient member, said resilient member acting on said washer element and a lower surface of said locking nut to bias the upper surface of said cartridge downwardly away from said locking nut to provide play between said cartridge and said locking nut and distribute a locking load from said locking nut to said cartridge.

* * * * *